Jan. 29, 1929.  
J. P. STREET  
1,700,552  
CLUTCH OPERATING MECHANISM FOR HOISTS  
Filed Oct. 4, 1926  
3 Sheets-Sheet 1

Joseph P. Street, Inventor

Jan. 29, 1929.  1,700,552
J. P. STREET
CLUTCH OPERATING MECHANISM FOR HOISTS
Filed Oct. 4, 1926  3 Sheets-Sheet 2

Joseph P. Street, Inventor

Jan. 29, 1929.  1,700,552
J. P. STREET
CLUTCH OPERATING MECHANISM FOR HOISTS
Filed Oct. 4, 1926   3 Sheets-Sheet 3

Joseph P. Street, Inventor
By C. A. Snow & Co.
Attorneys

Patented Jan. 29, 1929.

1,700,552

UNITED STATES PATENT OFFICE.

JOSEPH P. STREET, OF CHATTANOOGA, TENNESSEE.

CLUTCH-OPERATING MECHANISM FOR HOISTS.

Application filed October 4, 1926. Serial No. 139,428.

This invention relates to means for operating the friction bands on single and two-speed hoists and constitutes more especially a means whereby an exceedingly sensitive control of the mechanism can be effected.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

In the accompanying drawings, the preferred form of the invention has been shown.

In said drawings,

Figure 5 is a horizontal section, the gear hub and the friction drums being shown in plan.

Figure 1:
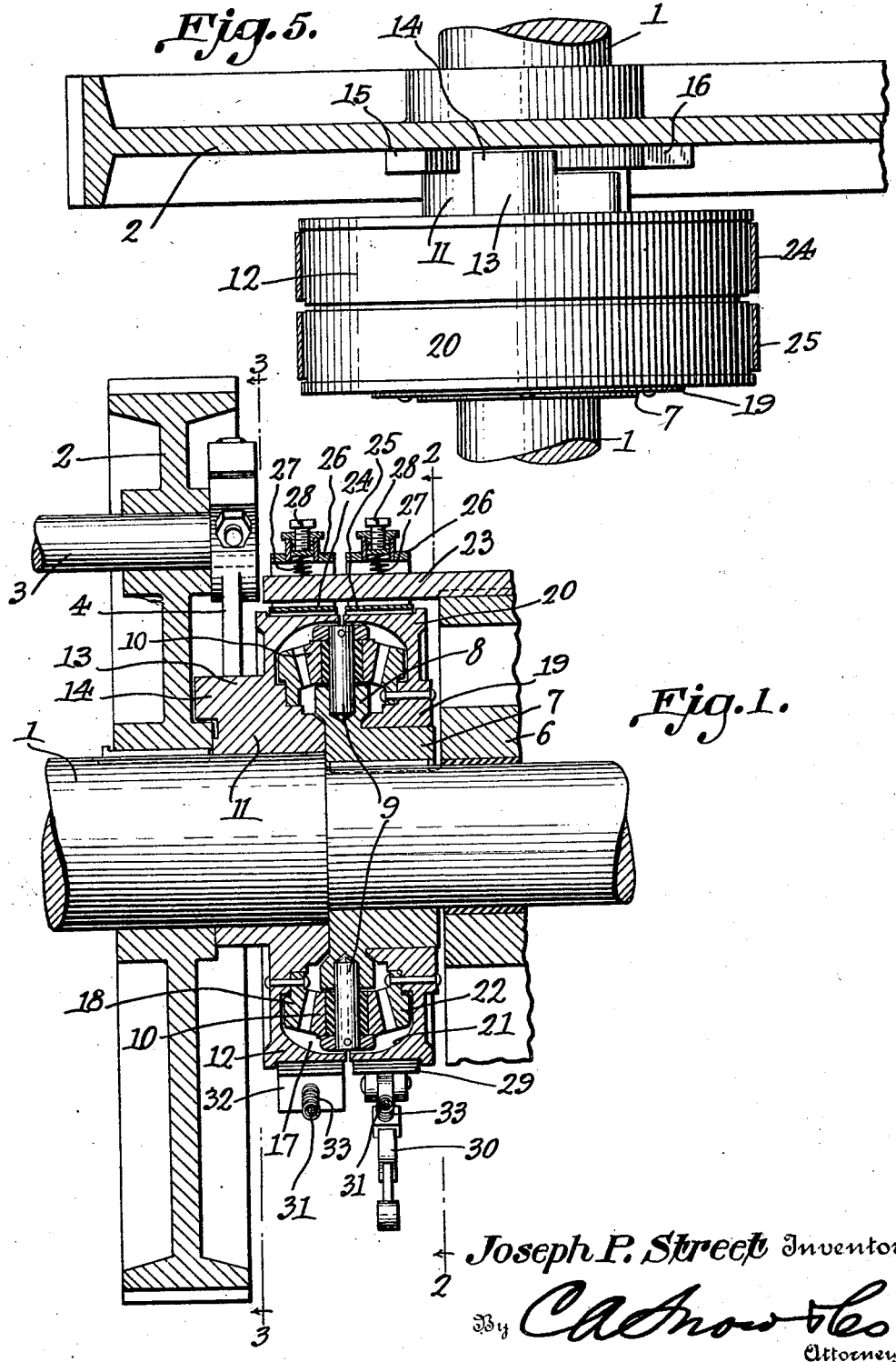
Figure 1 is a central longitudinal section through the parts constituting the present invention.
Figure 2:
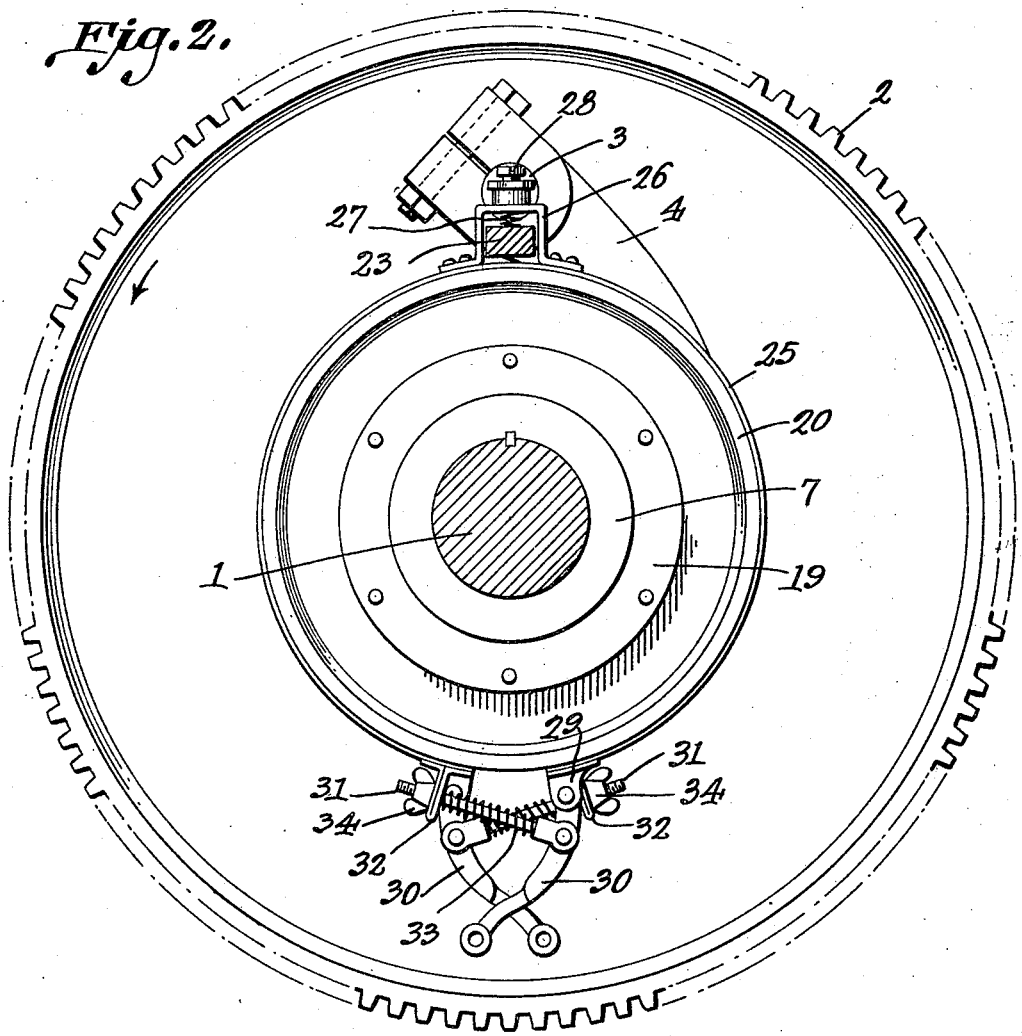
Figure 2 is a section on line 2—2, Figure 1.
Figure 6:
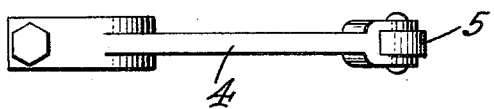
Figure 6 is a detail view of the arm of the master clutch mechanism.

Referring to the figures by characters of reference 1 designates the shaft of the hoist mechanism to which is keyed or otherwise secured the main gear 2 in which is journaled a shaft 3 having means, not shown, for operating the master clutch of the hoist so as to throw it on and off when said shaft is rotated back and forth. This master clutch and its operating mechanism in themselves constitute no part of the present invention and for this reason it is not deemed necessary to show or describe them in detail. A lever is fastened to one end of shaft 3 and constitutes a means for transmitting rocking motion thereto, this lever being provided at its free end with a roller 5. Shaft 1 is journaled in a suitable bearing indicated generally at 6 and keyed or otherwise secured to the shaft adjacent this bearing is a sleeve 7 having an annular flange 8 in which are seated radial pins 9 constituting bearings for beveled pinions 10.

Figure 4:
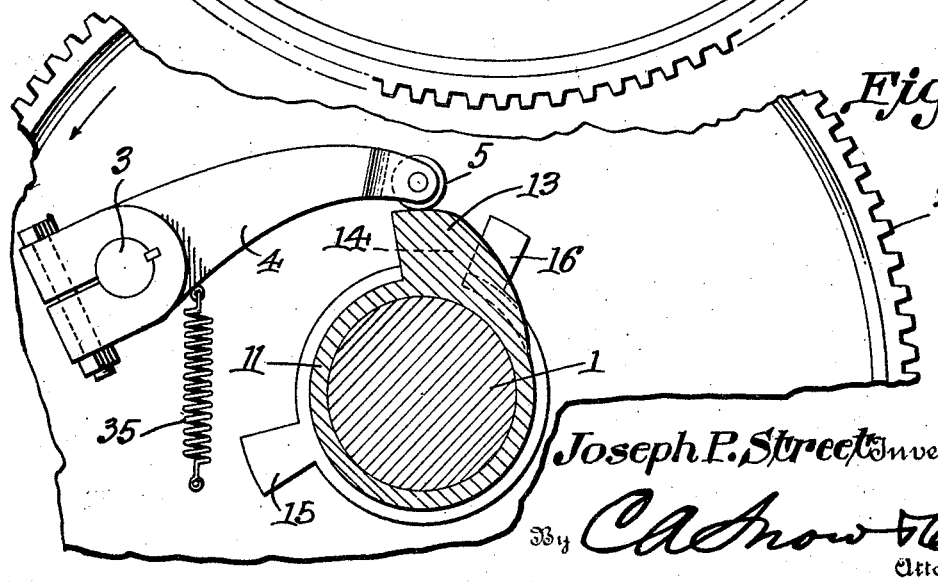
Figure 4 is a section similar to Figure 3 but showing only part of the gear, the lever of the master clutch mechanism being shown in position on its actuating cam.

Mounted to rotate freely on the shaft 1 between sleeve 7 and the gear 2 is the hub 11 of a friction drum 12. One end of the hub 11 carries a cam projection 13 for engagement with the roller 5 as shown particularly in Figure 4, and extending laterally from this cam projection 13 is a lug 14 designed to work between stop projections 15 and 16 carried by the gear 2.

Drum 12 has one face recessed as indicated at 17 and the beveled pinions 10 project into this recess and engage a beveled gear 18 which is located within the recess 17 and is secured to drum 12.

Mounted for rotation on the sleeve 7 between the bearing 6 and the flange 8 is the hub 19 of a drum 20. This drum has a recess 21 in one face into which projects the beveled pinions 10 and secured to this drum within recess 21 is beveled gear 22 constantly in mesh with the pinions 10.

A holding arm 23 is fixedly connected to the bearing 6 or other suitable structure and extends across but out of contact with the drums 12 and 20. Friction bands 24 and 25 are extended between this arm 23 and the respective drums, the band 24 being extended around the drum 12 while the band 25 is extended around the drum 20. A yoke 26 is secured to the middle portion of each of these bands and straddles the arm 23, thereby serving to hold the bands against creeping around the drums or rotating with them. Each of these yokes 26 has a compression spring 27 mounted therein and bearing against the arm 23 so that the spring serves to hold the friction band normally lifted at its center away from the drum with which it cooperates. The tension of each of the springs 27 can be varied by means of an adjusting screw 28.

Extending from one end of each friction band 24 and 25 is a bracket 29 to which is pivotally connected a lever 30. A rod 31 is pivotally connected to this lever and loosely engages an ear 32 extending from the other end of the friction band. A spring 33 is mounted on the rod and thrusts constantly against the ear 32 for the purpose of holding the free end portions of the friction band normally pressed apart, it being understood that the outer end of lever 30 is anchored to an operating rod or the like not shown. By means of a nut 34 which engages the threaded end of rod 31, the relative positions of the lever 30 and ear 32 can be varied and the compression of spring 33 can be regulated.

In using this apparatus the gear 2 and the sleeve 7 both rotate with the shaft 1. As the drums 12 and 20 are normally unrestrained, the rotation of the sleeve 7 and consequent travel of the pinions 10 about the axis of the shaft 1 will result in both drums 12 and 20 likewise rotating with the shaft so that there is no change in the relative positions of the cam 13 and lever 4. By tightening the friction band 24 upon the drum 12 through the actuation of its lever 30, said drum 12 will be held stationary and as shaft 1 is still rotating the roller 5 will travel onto the cam 13 to the position shown in Figure 4, thereby rotating shaft 3 so as to apply the master clutch.

Figure 3:
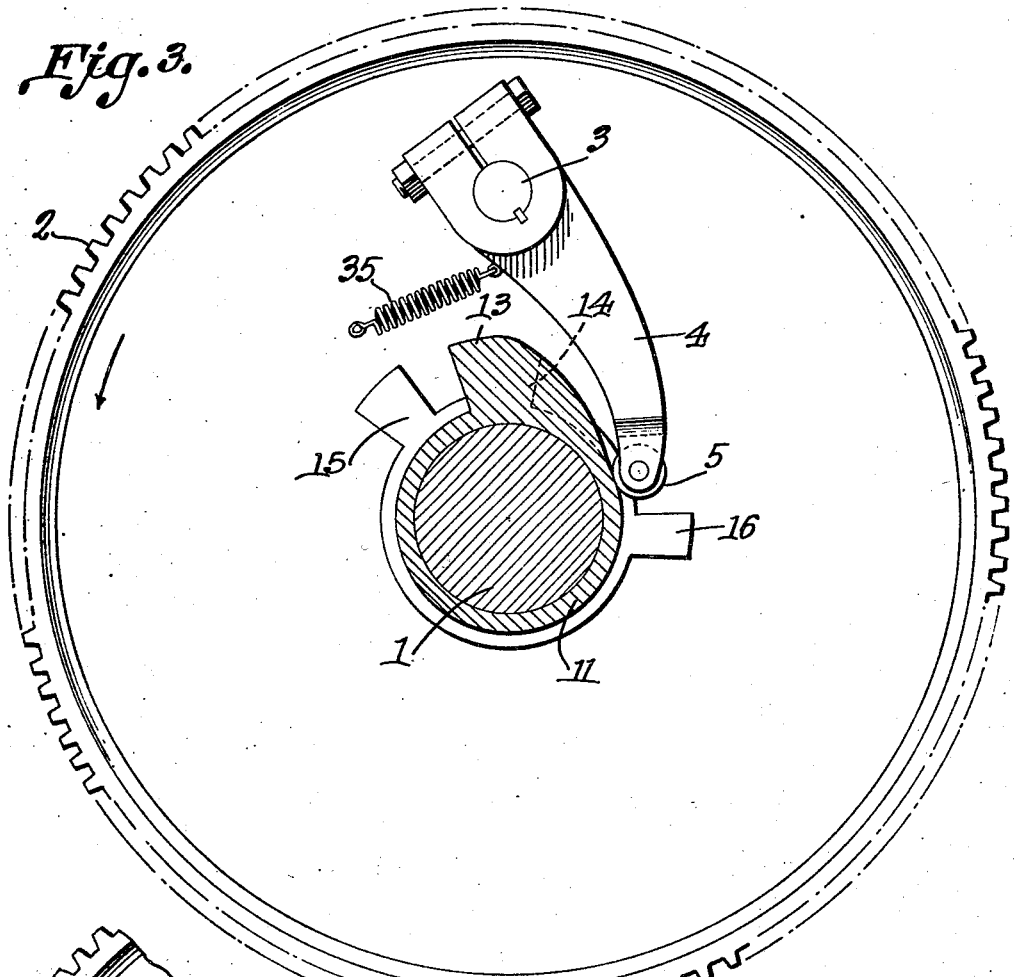
Figure 3 is a section on line 3—3, Figure 1.

To release the master clutch or, in other words, to allow the arm or lever 4 to swing inwardly to the position shown in Figure 3, the band 25 is clamped upon the drum 20 while drum 12 is released. Thus the continued rotation of shaft 1 will cause sleeve 7 to rotate within the hub 19 of drum 20 and the pinions 10 will be caused to travel along the stationary gear 22. Consequently motion will be transmitted through these pinions to the gear 18 and the drum 12, this drum being revolved at a greater speed than the gear 2 and thereby causing the cam 13 to work from under the roller 5 so that the master clutch thus becomes released. This inward movement of the arm or lever 4 can be assisted by the use of a spring 35.

As heretofore explained the operation of the friction bands is constantly under the control of suitably located members connected to levers 30 by rods not shown. These members are adapted to be actuated by the operator of the hoist.

The stop projections 15 and 16 cooperate with the lug 14 as before explained for limiting the relative rotation of gear 2 and hub 11.

What is claimed is:

1. The combination with a main shaft, a gear and a sleeve spaced apart and rotatable with the shaft, a rock shaft carried by the gear, and a lever fixed to the rock shaft, of a drum mounted for rotation on the shaft between the sleeve and gear, a lost motion connection between said drum and the gear, a drum mounted for rotation on the sleeve, a gear carried by each drum concentric with the shaft, pinions meshing with said gears and supported by the sleeve between the drums, a cam upon the first named drum, means for retarding the rotation of said drum during rotation of the gear to move the lever onto the cam to rotate the rock shaft, and means for holding the other drum against rotation thereby to actuate the gears to impart motion to the first named drum, thereby to shift the cam from engagement with the lever.

2. The combination with a main shaft, a gear secured thereto, a sleeve spaced from the gear and secured to the shaft, a rock shaft carried by the gear, and a lever extending from the rock shaft, of a drum mounted for rotation on the shaft between the sleeve and gear, a cam carried by said drum, a lost motion connection between the drum and gear, said drum when in one extreme position relative to the gear being located with its cam away from the lever and, when in its other extreme position relative to the gear being located with its cam in engagement with the lever, a second drum mounted for rotation on the sleeve, gears concentric with the shaft and carried by the respective drums, a plurality of pinions mounted for rotation about axes radiating from the sleeve, said pinions being carried by the sleeve and meshing with both gears, means under the control of an operator for holding one of the drums against rotation to transmit motion through the gears and pinions to the other drum and bring the cam to one extreme position, and means for holding the other drum against rotation to transmit motion through the drum, gears and pinion to shift the cam to its other extreme position.

In testimony that I claim the foregoing as my own, I have hereto affixed my signature.

JOSEPH P. STREET.